US006314112B1

(12) United States Patent
Hsu et al.

(10) Patent No.: US 6,314,112 B1
(45) Date of Patent: Nov. 6, 2001

(54) METHOD AND APPARATUS FOR NETWORK TRANSMISSION CAPACITY ENHANCEMENT FOR THE TELEPHONE CIRCUIT SWITCHED NETWORK

(75) Inventors: Danny K. Hsu, Morristown; Wei Lin, Parsippany, both of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/394,880

(22) Filed: Sep. 13, 1999

Related U.S. Application Data

(62) Division of application No. 08/852,619, filed on May 7, 1997, now Pat. No. 6,122,294.

(51) Int. Cl.[7] .................................................. H04J 3/18
(52) U.S. Cl. ........................ 370/477; 370/476; 370/522; 379/93.08
(58) Field of Search .................................... 370/476, 477, 370/480, 485, 486, 493, 496, 522, 396, 400; 379/93.01, 93.08, 93.14, 93.15

(56) References Cited

U.S. PATENT DOCUMENTS

| 4,748,621 |   | 5/1988  | Ballance et al. .  |         |
|-----------|---|---------|-------------------|---------|
| 4,866,773 | * | 9/1989  | Lubarsky          | 380/261 |
| 5,151,901 |   | 9/1992  | Shenoi et al. .   |         |
| 5,377,186 | * | 12/1994 | Wegner et al.     | 370/220 |
| 5,404,350 | * | 4/1995  | DeVito et al.     | 370/217 |
| 5,502,759 | * | 3/1996  | Cheng et al.      | 379/88.02 |
| 5,509,003 |   | 4/1996  | Snijders et al. . |         |
| 5,615,211 |   | 3/1997  | Santore et al. .  |         |
| 5,740,156 | * | 4/1998  | Tanabe et al.     | 370/409 |
| 5,854,835 | * | 12/1998 | Montgomery et al. | 379/119 |
| 5,905,724 | * | 5/1999  | Carson et al.     | 370/385 |
| 5,917,826 | * | 6/1999  | Naessl et al.     | 370/442 |
| 5,923,659 | * | 7/1999  | Curry et al.      | 370/401 |

FOREIGN PATENT DOCUMENTS 2271485A    4/1994  (GB) .

* cited by examiner

Primary Examiner—Ajit Patel
Assistant Examiner—Bob A. Phunkulh

(57) ABSTRACT

Adjunct apparatus for increasing network transmission capacity provides a low-cost, efficient solution for increasing the network transmission capacity of the existing telephone circuit switched network, while keeping the current network equipment unchanged. A Local Switch Network (LSN) Adjunct (LSNA) and a Tandem/Toll Switch Network (TSN) Adjunct (TSNA) interface with standard network elements, such as switches and cross connect equipment. These network adjuncts, comprising a set of low-bit rate speech coders, a dynamic timeslot manager and other supporting functions, advantageously transmit to and receive from a T1/T3/OC3/E1 trunk. More than one channel of voice is carried on one 64 Kbps DS0 timeslot, while still maintaining the voice at toll quality. A sub-timeslot and sub-timeslot bundling are introduced in the standard T1 or E1 frame where each sub-timeslot is analogous to a single bit of the typical eight bit word to provide more than 24 or 30 voice channels respectively. Inband control information is generated for carrying over a T1 or E1 trunk, for example, for mapping sub-timeslot bundles to channels. Conventional out-of-band signaling is provided via SS-7 or other out-of-band signaling system.

12 Claims, 10 Drawing Sheets

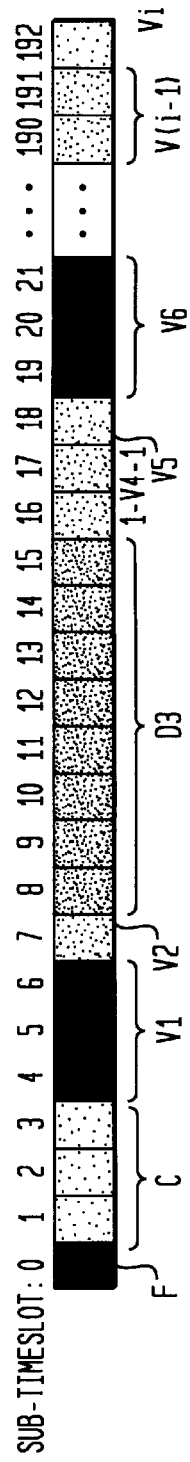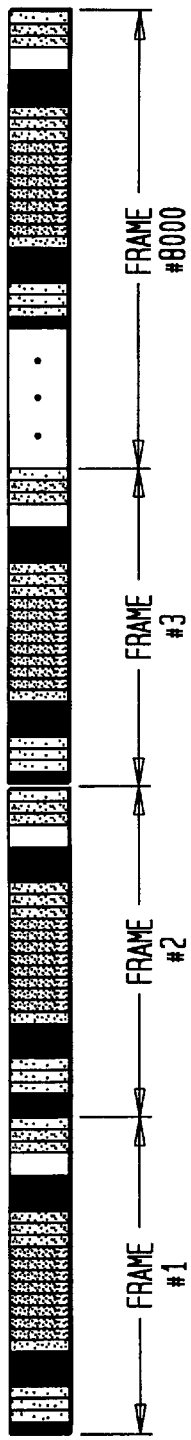

METHOD AND APPARATUS FOR NETWORK TRANSMISSION CAPACITY ENHANCEMENT FOR THE TELEPHONE CIRCUIT SWITCHED NETWORK

This applicant is divisional of prior application Ser. No. 08/852,619, filed May 7, 1997, now U.S. Pat. No. 6,122,294.

BACKGROUND OF THE INVENTION

1. Technical Field

The present invention relates generally to the field of voice signal compression in telecommunications networks to enhance transmission capacity and, more particularly, to the field of providing voice compression in existing telephone circuit switched networks that employ T1 and E1 frame formats while keeping the network infrastructure unchanged.

2. Description of the Relevant Art

Pulse code modulation for sampling voice signals and modulating a pulse coded data stream for transmission has been known since the 1960's. Two forms of pulse code modulation are the so-called $\mu$-Law and the A-law modulation formats of T1 and E1 frames respectively. Both share the common principle that 8 bit pulse code words describe a speech signal or, alternatively, carry data or facsimile. In the T1 frame, 24 such eight bit words and a framing bit comprise a 193 bit frame. Each eight bit word describes a voice signal sample of a different speech communication. The eight bit words are formed into the 193 bit frame of FIG. 1(a) such that a framing bit 101 signals the beginning of the frame and/or is used for synchronization. The framing bit 101 is followed successively by the 24 8-bit $\mu$-Law pulse coded words representing samples of 24 different voice communications or facsimile/data channels. The 24 words each represent a time slot or channel where timeslot or channel #1 is timeslot 102. Thus, for example, a maximum of twenty-four voice communications can be transmitted by one so-called DS1 channel bank. Timeslot or channel #2 is timeslot 103 and so on until the twenty-fourth time slot or channel #24 is represented as timeslot 104. Channels #3–23 are also timeslots and are indicated by the dotted box between timeslot 103 and timeslot 104.

The pulse code modulation process for encoding voice signals is well known. A speech wave is sampled at periodic discrete points in time to obtain pulses having different amplitudes. The speech signal amplitude is then quantized among, for example, 128 or 256 different levels and the least significant digit in each eight bit word in one frame out of six may be used for in band signaling. To quantize 256 levels requires 8 bits and, if the sampling rate is 8000 samples per second, the bit rate or information carrying capacity of each T1 carrier channel is 8 bits×8000 samples per second or 64 kbits/sec. In band signaling means carrying the signaling information for, for example, addressing or control information within the band of the T signal format. Out of band signaling recently has become preferred as an alternative or in addition to in band signaling where signaling information is transmitted via a separate transmission path, for example, via so-called SS-7 out-of-band signaling equipment. Referring briefly to FIG. 4, SS7 out-of-band signaling links are shown by dashed lines 480–487.

Referring to FIG. 1(b), there is shown a typical E1 frame data format wherein, instead of twenty-four channels or timeslots, thirty-two channels or timeslots are provided. The form of pulse code modulation is known as A-law pulse code modulation in the E-1 format. Of the thirty-two channels provided, thirty are utilized for carrying communications such as voice, fax and data communications. Timeslot or channel #1 is shown as timeslot 121; timeslot or channel #2 is shown as timeslot 122 and timeslot or channel #15 is shown as timeslot 123. Intermediate channels #3–14 which are also timeslots are indicated by the dotted omission. The sixteenth timeslot or channel, Timeslot #16, shown as timeslot 124, comprises 8 bits of in-band signaling data. Timeslot #17 or timeslot 125 is again a voice, data or fax channel. Timeslots #18–30 are not shown but as the dotted line omission, and Timeslot #31 or timeslot 126 is another voice, data or fax channel. Timeslot #32 comprises a predetermined eight bit framing signal 127.

Telecommunications traffic is carried on trunks between telephone switching offices. There are generally two types of telephone switching offices, a local switch and a toll or tandem switch. The local switch connects a telephone subscriber to the public switched telephone network. A tandem switch connects local switches or a local switch to a toll switch. A toll switch connects tandem switches to toll switches or connects toll switches. Trunks are sized traditionally into trunk groups based on the amount of traffic carried. A trunk that may have a capacity of 64 Kbits per second sits idle during non-peak periods and at busy periods wastes a portion of its 64 Kbits per second capacity carrying speech traffic.

Data and fax communications are presumed relatively data efficient in comparison with voice communications. Voice communications are frequented by periods of silence when no intelligible sounds, detectable as speech energy, are present. During a typical voice communication between parties talking together over a communications link, there are frequent periods of silence. Consequently, there is an opportunity in a voice communication to provide voice compression; that is, provide for utilization of periods of silence among other compression principles during the bandwidth of a voice communication by filling the silence with periods of voice from other communications. Both analog and digital forms of voice compression are known. Most, if not all, forms of voice compression utilize the dead or silence periods in speech to advantage. For example, a particular given period of time within a single voice communication channel may comprise a plurality of segments of speech from a related plurality of voice communications. In this manner, not just one voice communication is carried on the channel but a substantial increase in the number of concurrently handled calls on the same channel is obtained. The given period is broken into time slots and each time slot may comprise an active voice segment. Periods of silence are eliminated. A minor disadvantage is that the decompression and reassembly of the original voice communications carried over such a channel may take some time and so result in some delay, but the delay is not significant. Also, control information is required to describe the process of compression so that decompression can occur at a receiver. These are minor disadvantages in comparison to the enhancement in transmission capacity obtained. Moreover, practically none of the original speech content of the voice communication is lost. One known voice compression algorithm is that presently contemplated for application with video signal compression and is known as the M.P.E.G. II algorithm proposed standard.

The T carrier channel or timeslot is inherently inefficient, for example, timeslot 102, because the timeslot frequently carries periods of silence, silence that could be filled by voice segments of other voice communications. The E1 frame format is inefficient for the same reasons. Once a voice communications channel in either is dedicated to a particular voice communication in a call between two or more speaking parties, the channel remains so dedicated. There is no opportunity to share the voice communications channel. Of course, a fast talker makes more efficient use of the dedicated channel than a slow talker. Nevertheless, with either kind of caller, there is considerable inefficiency in communication.

To be competitive in today's telephony business, reducing the cost of handling telephone calls and increasing the existing network capacity have become crucial issues. Increasing the capacity of the network means the addition of more trunk facilities and network switches. However, this is a very expensive venture. Currently, a voice channel is transmitted at 64 Kbps in A-Law or $\mu$-Law PCM format as described above with reference to FIG. 1. Dedication of a whole timeslot or 8 bit word as described above to voice is very expensive in terms of bandwidth utilization. Fax and data are transmitted in 64 Kbps bursts and so are more bandwidth efficient than voice. The existing T1 or E1 networks use T1 or E1 frames which contain twenty-four or thirty 64 Kbps voice channels, respectively. Each 64 Kbps voice channel or timeslot, contains one 8 bit word per T1 or E1 frame. The sampling rate is 8000 times per second. Since eight thousand frames are transmitted per second, the twenty-four channel bit rate is 24 channels×64 kbps per channel or 1.544 megabits per second including framing. The information transmission efficiency of this 1.544 megabit per second signal is much less. According to the well known digital multiplex hierarchy for digital data transmission, there is ample opportunity to improve the information carrying capacity at all levels from the so-called DS1 to DS4 levels and beyond. Consequently, it is an object of the present invention to improve the information carrying capacity of digital transmission facilities.

With the emergence of toll quality, low-bit rate speech coders and high-speed Digital Signal Processors (DSPs), an object of the present invention is to increase the network capacity by reducing the bandwidth of the voice channel and at the same time to maintain the voice signal at toll quality.

SUMMARY OF THE INVENTION

The present invention creates a tremendous advantage in the existing telephone circuit switched network by increasing the network transmission capacity up to seven fold. Local and toll network adjuncts are provided in the public switched telephone network which interface to standard network elements and provide for voice compression within T1 and E1 frames. In keeping with the present invention, each channel or timeslot, normally comprising an 8 bit word is regarded, not as comprising 8 bit words, but as comprising individual bits or sub-timeslots such that a frame comprises eight times as many sub-timeslots as timeslots or channels. For example, referring briefly to FIG. 2(a) in a T1 frame there are, according to the present invention, 192 sub-timeslots which are dynamically allocated to voice/data/fax communications according to whether there is speech activity or tone/data is recognized. A 193rd timeslot 101 is still reserved for framing. A decrease in bandwidth is achieved by coding the voice so that it occupies 1, 2, 3, 4 or more bits or sub-timeslots within a conventional timeslot or channel and so the traditional channel is shared among voice communications. Any time fewer than 8 sub-timeslots are utilized for a voice communication, transmission capacity is saved.

In summary, the traditional T1 frame is composed of 193 single bit sub-timeslots instead of twenty-four 8 bit timeslots or channels per FIG. 2(a). Likewise, the E1 frame is viewed as having 240 sub-timeslots as shown in FIG. 2(b). In a best case voice scenario, if a single bit is used to represent a voice channel and some additional bits of the frame are utilized for control overhead, this decrease in usage of conventional timeslot capacity can possibly give rise to a seven fold increase in the capacity of the network. If fax or data is recognized, then, because of its information carrying efficiency, the entire typical eight bit word carries the fax or data. On the other hand, if speech activity is recognized, as few as a single sub-timeslot may represent an idle channel or a voice segment or as many as eight sub-timeslots may represent a voice segment. Hence, an increase in transmission capacity up to seven fold is obtained.

In the case of a T1 or E1 network, instead of transmitting a voice channel in one 64 Kbps DS0 timeslot, the present invention utilizes the emerging technologies of low-bit rate speech coders and high-speed Digital Signal Processors (DSPs) to increase the network transmission capacity by effectively reducing the bandwidth required of each voice channel, while still maintaining the voice at toll quality. Therefore, this invention provides a method and apparatus to increase the network transmission capacity without increasing the network cross-connect equipment and the transmission trunk facilities.

The present invention incorporates the low-bit rate speech coding scheme with dynamic network transmission bandwidth management to create a new network architecture. While implementation of the present invention requires the use of additional equipment to the current infrastructure in order to augment the network capacity, the present network infrastructure requires no modification. The invention comprises adjuncts to the present network which provide additional voice transmission capacity.

Referring briefly to FIG. 4, a network architecture according to the present invention consists of Local Switch Network Adjuncts (LSNA) and Tandem/Toll Switch Network Adjuncts (TSNA), which interface with the standard network elements, such as switches and cross connect equipment. These network adjuncts, comprise a set of low-bit rate speech coders, a dynamic timeslot manager and other supporting functions. Each advantageously transmits and receives to and from a conventional T1/T3/OC3/E1 trunk such that more than one channel of voice is carried on one conventional 64 Kbps DS0 channel or timeslot, while still maintaining the voice at toll quality. Additionally, in the standard T1 or E1 frame, a single sub-timeslot or a bundle of sub-timeslots provide more than 24 or 30 voice channels, respectively. Control information for controlling decompression and decoding is carried in band and signaling information may be transmitted in a conventional manner either in or out-of-band.

BRIEF DESCRIPTION OF THE DRAWINGS

FIG. 2 represents a drawing of how the conventional frame formats of FIG. 1 are modified according to the present invention to provide for sub-timeslots where

FIG. 3 provides an overview of one example of dynamically allocating sub-timeslots to voice, fax and data communications within a T1 frame where at certain points in time, a voice channel may represent a single sub-timeslot and at others, a bundle of two, three or more sub-timeslots.

DETAILED DESCRIPTION

Figure 1A:
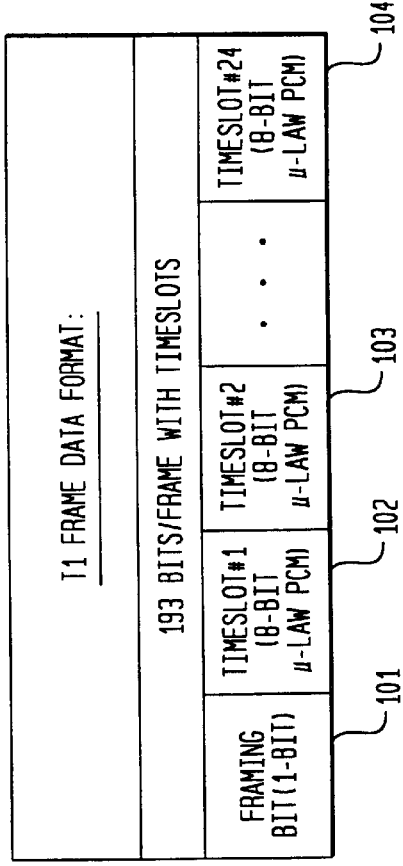
FIG. 1 is a drawing of known pulse code modulation formats where FIG. 1(a) describes the T1 frame data format and FIG. 1(b) describes the E1 frame data format.

The present invention provides a novel view of the T1 and E1 frames, which includes the idea of a sub-timeslot and the bundling of sub-timeslots. Currently, the T1 frame is viewed as having twenty-four 64 Kbps channels or timeslots. Each of the twenty-four voice channels consists of 8 bit words in one T1 frame, obtained and transmitted at a sampling rate of eight thousand samples per second. Hence, the smallest unit of transmission is an 8 bit timeslot or channel, representing 64 Kbps of information. Throughout this document, the use of the term "T1 frame" refers to a T1 frame containing 24 timeslots or channels, each timeslot representing 8 bit words and each bit of which words represents a data throughput of 8 Kbps of data. Also, the use of the term regular E1 frame refers to a E1 frame containing 32 timeslots, each timeslot representing 8 bit code words and each bit of which representing 8 Kbps of data. The present invention is seeking to take this view further and to redefine the smallest unit of transmission to be a 1 bit sub-timeslot, each bit representing a voice/fax/data sample and allocated dynamically depending on speech activity or its tone/data characteristic. As a result, the standard T1 frame now contains 193 sub-timeslots, with each sub-timeslot being 1 bit representing a data throughput of 8 Kbps.

Also, while pulse code modulation is the modulation format described in some detail herein, the present invention should not be construed to exclude other formats in which the present invention may be used to advantage. These include and are not limited to Adaptive Differential Pulse Code Modulation (ADPCM), Adaptive Predictive Coding (APC), Code Excited Linear Predictive (CELP) coding, Vector Summed Linear Predictive Coding and the like.

Figure 1B:
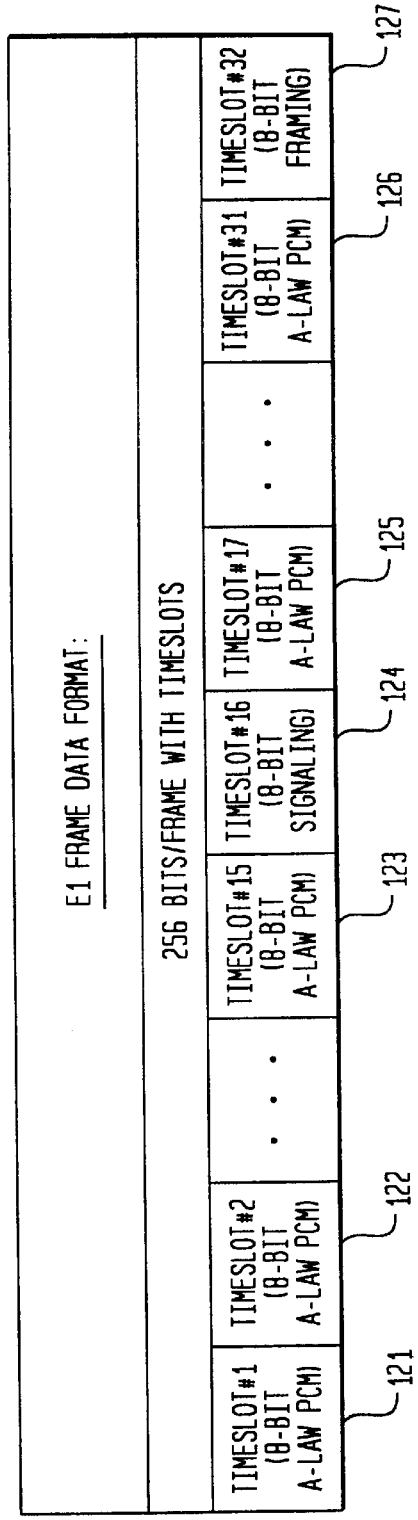
Figure 2A:
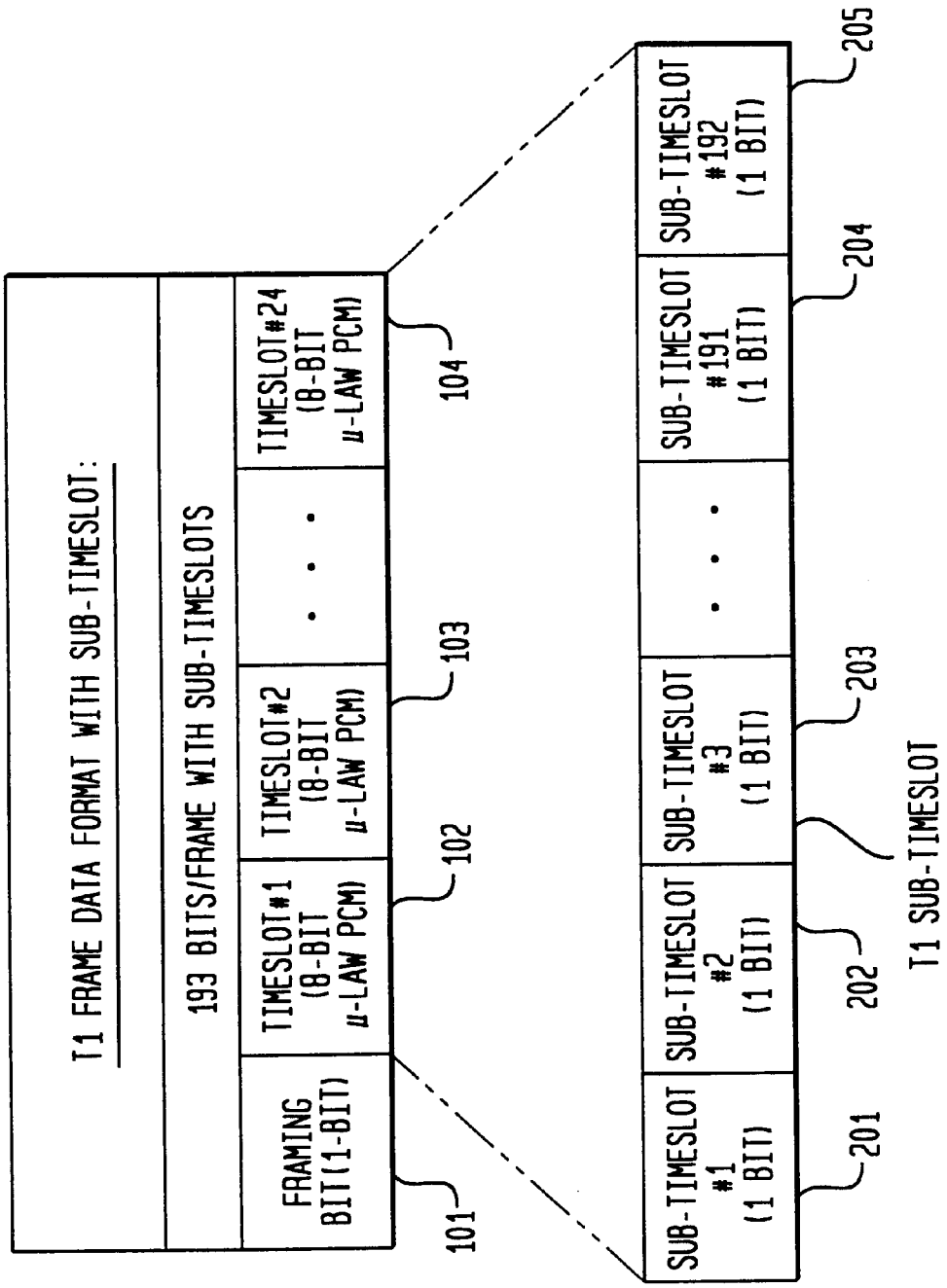
FIG. 2(a) represents a modification of the T1 frame data format with sub-timeslots and FIG. 2(b) represents a modification of the E1 frame data format with sub-timeslots.
Figure 2B:
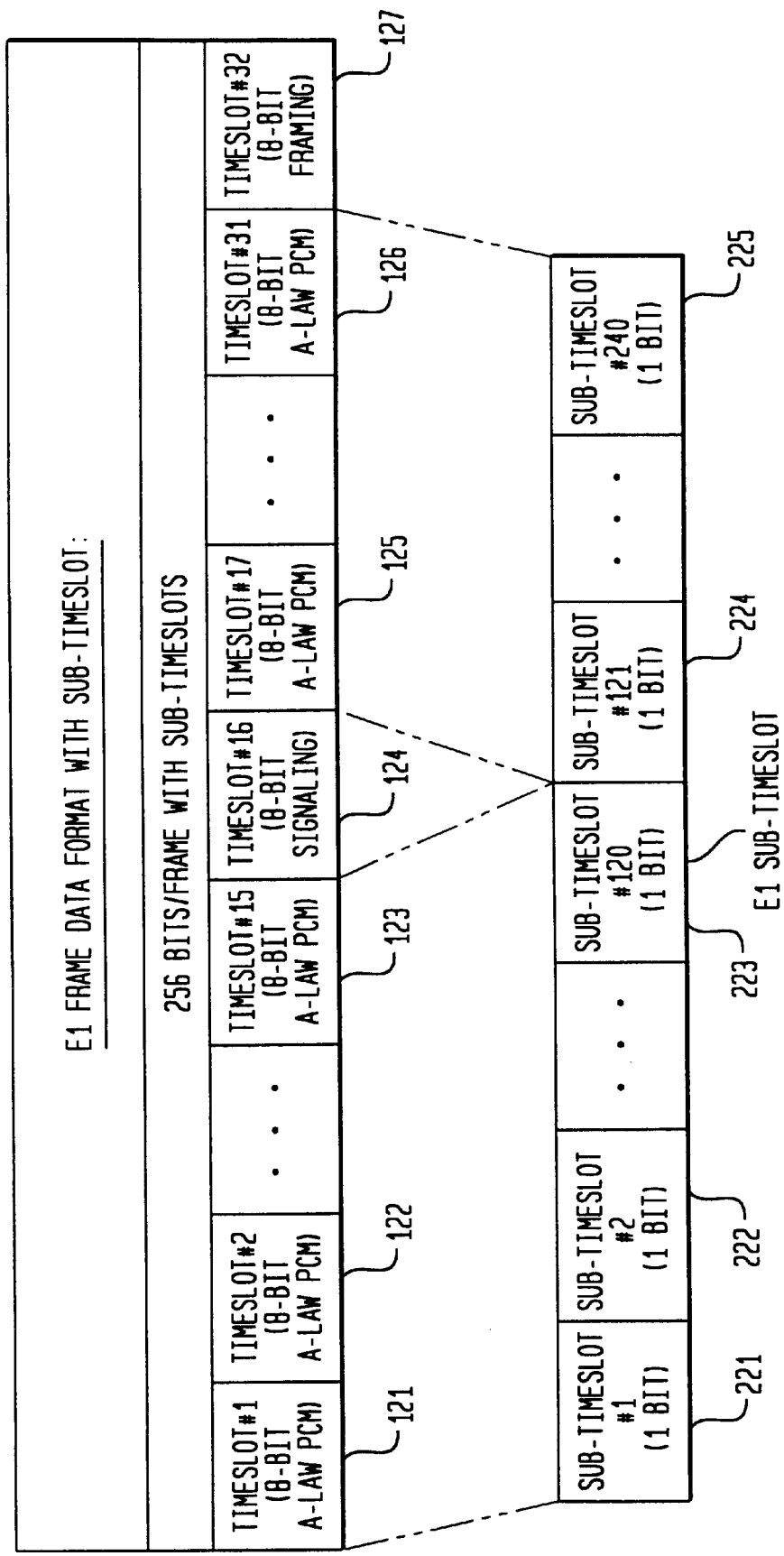

FIGS. 1 through 3 illustrate the concepts of sub-timeslot and sub-timeslot bundling used in the dynamic network transmission bandwidth management to increase network capacity and flexibility according to the present invention. In the standard T1 frame (FIG. 2(a)), the concept of a sub-timeslot is introduced to provide more voice channels over transmission facilities. Each sub-timeslot 201, 202, . . . 205 only takes 1 bit so that each T1 frame contains 193 sub-timeslots. The first sub-timeslot 201 is reserved for a framing bit followed by 192 other sub-timeslots which may be bundled as required for voice, used for fax or data or used as a control link containing inband control information. Depending on the speech coder data rate and the voice signal activity, each voice channel may need to bundle several sub-timeslots. As a result, a voice call can occupy anywhere from 1 to 8 sub-timeslots ranging from 8 Kbps to the conventional maximum of 64 Kbps. Fax and data modem traffic are still transmitted at 64 Kbps which require 8 sub-timeslots per fax or data channel in each T1 frame.

The concepts of sub-timeslots and the bundling of sub-timeslots are not confined to networks that use the T1 frame but are also applicable to networks that use the E1 frame. So, even though the T1 frame is used to illustrate the present invention, the present invention is not limited to networks that use the T1 frame. Per FIG. 2(b), the E1 frame may be considered as comprising 240 sub-timeslots of 1 bit each which may be bundled as required for voice and control data transmission. As described above, any time fewer than eight bits are used for a voice communication, transmission capacity is enhanced. Also, the concepts may be applied to other than a pulse code modulation scheme of modulation as introduced above. Other possible coding techniques that may be employed include but are not limited to Adaptive Differential Pulse Code Modulation (ADPCM), Adaptive Predictive Coding (APC), Code Excited Linear Predictive (CELP) coding, Vector Summed Linear Predictive (VSLP) coding and the like.

The concept of sub-timeslot and sub-timeslot grouping, for example, into bundles in order to increase the capacity requires the addition of new equipment to the existing circuit switched network, since the present equipment does not have the necessary intelligence required to decipher the information carried in the newly formatted T1. For example, the typical toll switch is a #4 Electronic Switching System (ESS) manufactured by Lucent Technologies. This switch as well as other core network elements are not intelligent enough to handle other than T1 or E1 formatted frames. As a result, adjuncts, according to the present invention, are placed in the network to take the sub-timeslots and format them back into T1 timelsots/channels before sending the information to the switches. Referring briefly to FIGS. 4–9, the present invention requires the use of such adjunct equipment, for example, a local switch network adjunct (LSNA) connected to a local switch and a toll or tandem switch network adjunct (TSNA) connected to a tandem or toll switch. The LSNA or TSNA will handle all traffic, voice, fax, and data. Conventional in band or out-of-band SS7 signaling links will still be maintained by the local and tandem switches for signaling.

FIG. 3 describes how the sub-timeslots of the present invention may be bundled taking an example of a T1 frame of 193 sub-timeslots. A typical T1 frame comprises 24 eight bit time slots or channels. According to the present invention, sub-timeslots are dynamically allocated to voice, data and fax transmission as required. The allocation process may, for example, comprise bundling of sub-timeslots together or transmitting groups of timeslots in predetermined manner that may be interleaved. Control information is generated for transmission with the voice/data sub-timelsots which, for example, describe the allocation and the coding schemes. Once a call is set up between telecommunications subscribers, the control information beyond that point in time becomes relatively consistent. While interleaving may be an alternative to bundling of sub-timeslots, interleaving may require a large volume of transmission of constantly changing control information that may even be required on a per frame basis.

Figure 5:
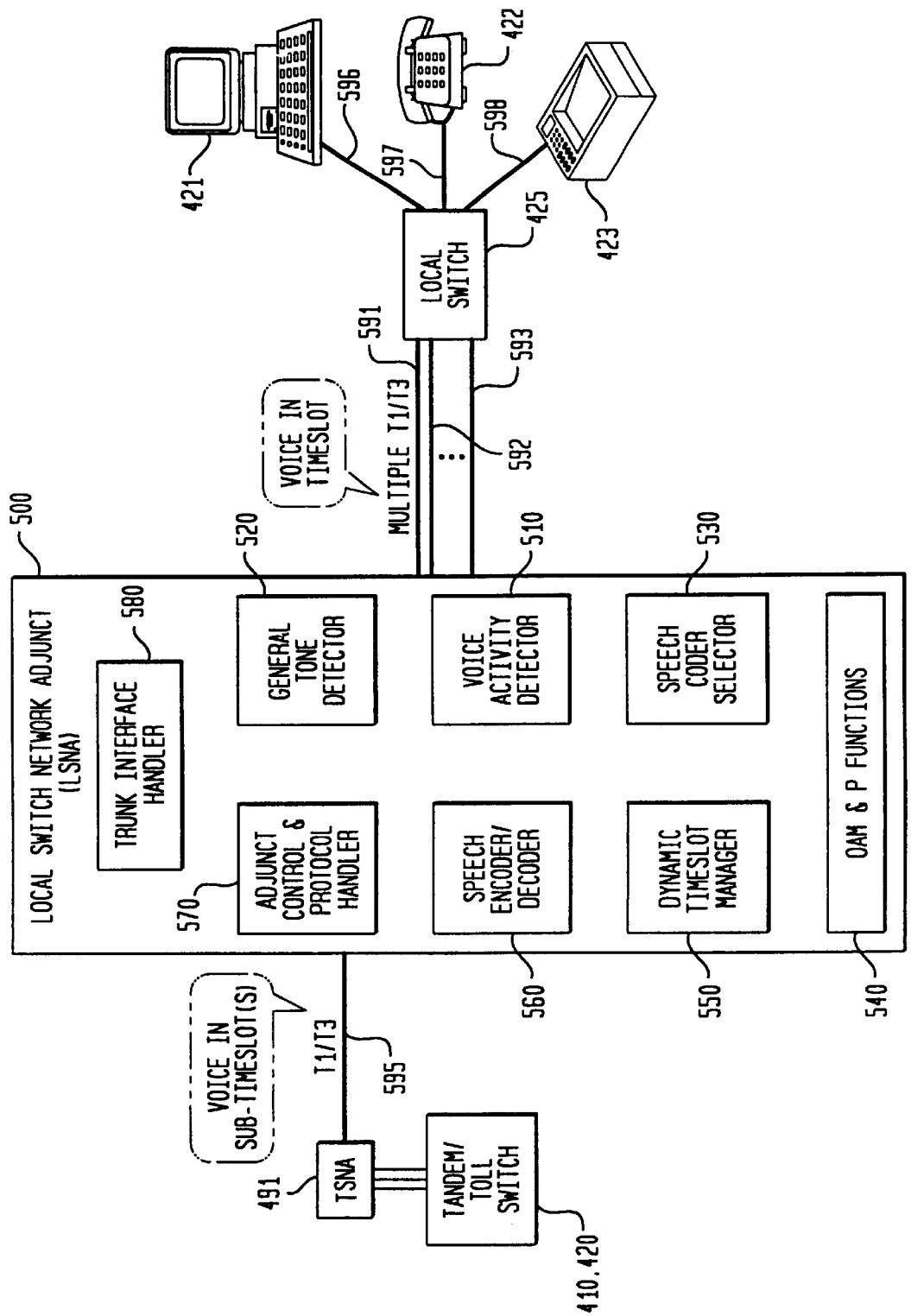
FIG. 5 provides an overview of the functionalities required of the local switch network adjunct of the present invention.

As will be further described herein in connection with FIG. 5, an LSNA comprises a general tone detector and a speech energy or energy detector for detecting characteristics of each communication. These characteristics comprise, for example, where a trunk is idle or free, whether data or fax is being carried on a busy trunk and if a voice communication, whether there is presently a period of silence or there is voice activity. During peak traffic hours, if a whole trunk group is busy, then the present invention contemplates that the busy status may require a lower level of voice coding. Twice as many voice users can be supported during peak traffic hours, for example, by 4 bit in stead of 8 bit coding. If trunk usage is low, then there is no penalty in providing 64 Kbps voice coding and, as will be further described herein, a coder selector of a network adjunct may operate accordingly.

Referring to FIG. 3, FIG. 3(a) comprises one embodiment of a T1 frame according to the present invention; FIG. 3(b) comprises a table for describing the allocation of sub-timeslots for the exemplary frame embodiment of FIG. 3(a) and FIG. 3© shows how frames such as FIG. 3(a) are assembled into a T1 data stream of 8000 frames. Referring to FIGS. 3(a) and 3(b), sub-timeslot #0 still represents a framing bit F as in a conventional T1 frame. The remaining 192 sub-timeslots are allocated differently than in a conventional manner. Control information describing, for example, how the bandwidth of the T1 frame is dynamically allocated for decompression may be provided, for example, in a bundle of sub-timeslots #1–3. The control information, for example, may describe how the frame is delimited and provides information of the start and end of frame data portions and provides channel to sub-timeslot mapping information among other control information. In the case of speech frames, the boundaries between frames do not have to be predetermined, since the loss of a frame or two will not severely impact the quality of the transmitted voice signals. The control information may be transmitted here as shown in FIG. 3(a) or elsewhere, for example, in preceding frames so as to identify how the next succeeding frame is compressed and transmitted or otherwise than in a bundle. The control information may be collected from a plurality of frames over time and interpreted at a receiving adjunct or may be transmitted as a special control frame comprising entirely of control data.

Besides framing and control information, as many as i voice, data or fax communications may be carried by a T1 frame according to the present invention, where i is greater than 24. For example, sub-timeslots #4–6 may comprise a bundle of sub-timeslots for coding a first voice communication, V1. Depending on the coding level, a single sub-timeslot, for example, sub-timeslot #7 may represent a second voice channel, V2. Fax or data which is highly efficient or voice traffic depending on the coding level may require a conventional eight bits or sub-timeslots, for example, sub-timeslots #8–15. These are shown identified in the T1 frame according to the present invention as the third channel or channel D3. A fourth channel comprises a voice channel consuming two sub-timeslots #16 and #17, shown as channel V4. A fifth voice channel V5 is shown consuming only sub-timeslot #18. A sixth voice channel V6 is shown consuming three sub-timeslots, sub-timeslots #19–21, and so on. The next to last or i–1 channel consumes two sub-timeslots #190–191; the last or ith channel consumes just one sub-timeslot #192. Thus, it can be seen that in a typical T1 frame many more than 24 voice or other communications can be carried enhancing transmission capacity where i is substantially greater than twenty-four.

The next succeeding frame need not have the same bundling as the predecessor. Moreover, it is not necessary to bundle the sub-timeslots as shown. For example, when the range of coders may comprise an 8 Kbps coder, a 16 Kbps coder and a 24 Kbps coder, there may be 1, 2 or 3 sub-timeslots bundles together depending on the level of coding selected. In general, control information is especially necessary when fixed length frames are not being used, but, in the present case, the control information may be minimal and spread over several frames. The control information, as introduced above, should carry sufficient data for delimiting the frames. In the case of speech frames, the boundaries do not have to be absolute, since the loss of a frame or two will not severely impact the quality of voice. It is very important to note that once a voice communication or a call is set up in the network, the control information following call setup will be reasonably consistent.

Referring briefly to FIG. 3(c), it may be seen that the exemplary T1 frames of FIG. 3(a) are transmitted in sequence to form a T1 data stream of 8,000 frames where the frame of FIG. 3(a) is shown as Frame #1 of the T1 data stream of FIG. 3(c).

Figure 4:
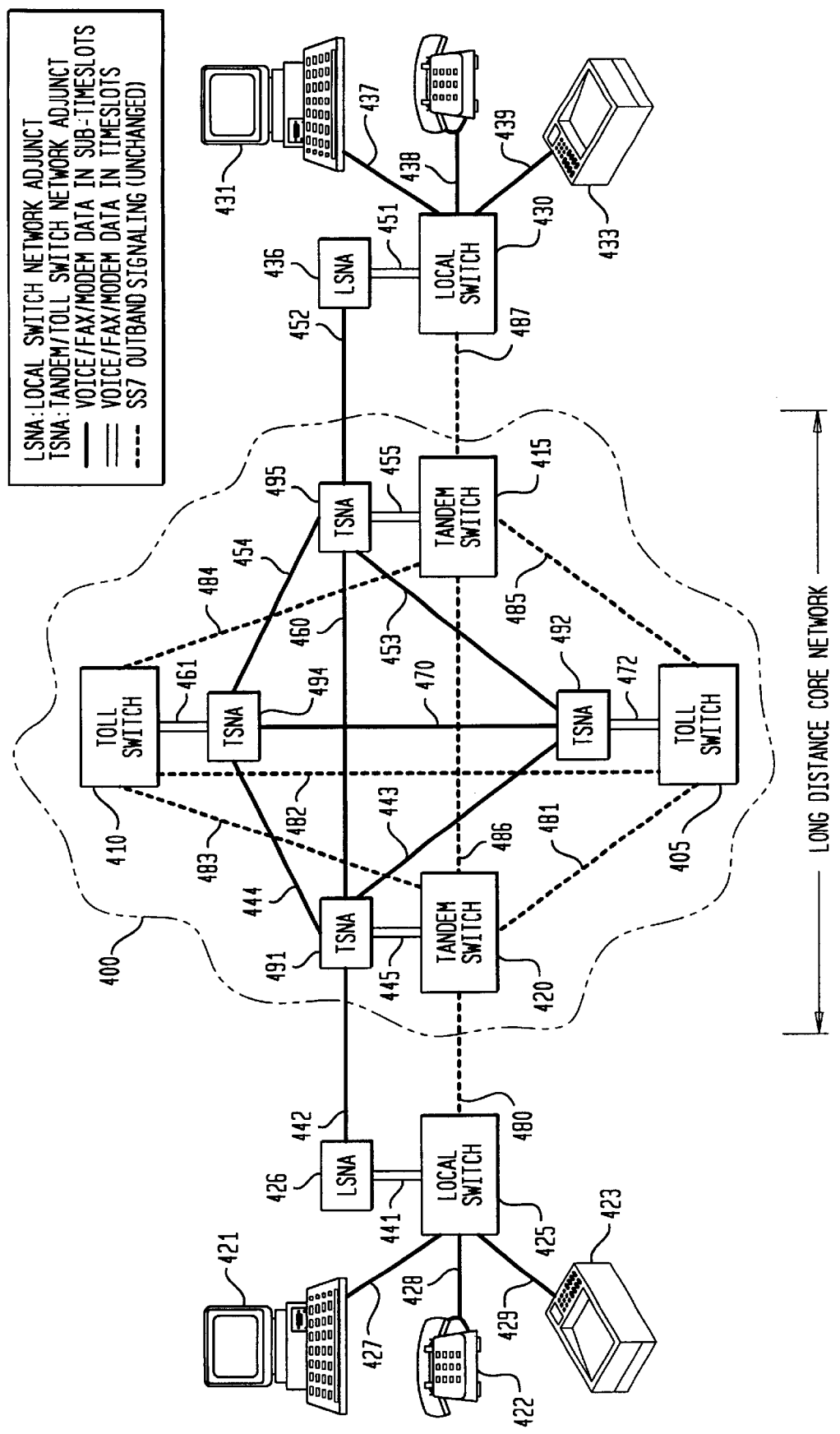
FIG. 4 provides a network diagram showing how the present network structure may be augmented according to the present invention to enhance transmission capacity by providing local and tandem or toll switch network adjuncts at switch locations of the network.

FIG. 4 shows an illustrative embodiment of the present invention used in the telephone circuit switched network. Typically, a local switch, for example, local switch 425 connects subscribers with various equipment to the long distance core network 400. Local subscribers may have various equipment types generating various signals, for example, telephone 422 generates voice signals from transducing a user's voice, a facsimile machine 423 generates fax signals and a personal computer modem 421 generates data signals. These devices are connected by wire or wireless means, conventionally referred to as subscriber loops 427, 428, 429 to the local switch 425. These devices should not be considered the only devices generating signals that may be carried by sub-timeslots of the present invention. Others may come readily to mind such as cable television terminals, television terminals, pager devices, personal locator devices, personal communications terminals and the like.

According to the present invention, a LSNA 426 or 436 is connected to the local switch 425 or 430 and acts as a front-end for communicating with a TSNA 491, 495 which is connected to a tandem or toll switch such as toll switch 405, 410 or tandem switch 415, 420. The LSNA 426, 436 receives a voice communication or data/fax communication and is responsible for dynamic bandwidth allocation to a digital facility. The existing network elements such as digital cross connect equipment, which have standard T1/T3/OC3 interfaces, are unchanged. The voice channels transmitting between any two switches may be transmitted through the LSN and/or TSN Adjuncts in a compressed manner, while the fax/modem data are kept at the original data rate and level of coding. In addition to the voice/fax/modem channels, an inband control data link is provided between any two adjuncts for controlling decompression and decoding. Call control and call routing information for each circuit switch channel are still carried through the out-of-band SS7 network or in a conventional in band manner.

Figure 6:
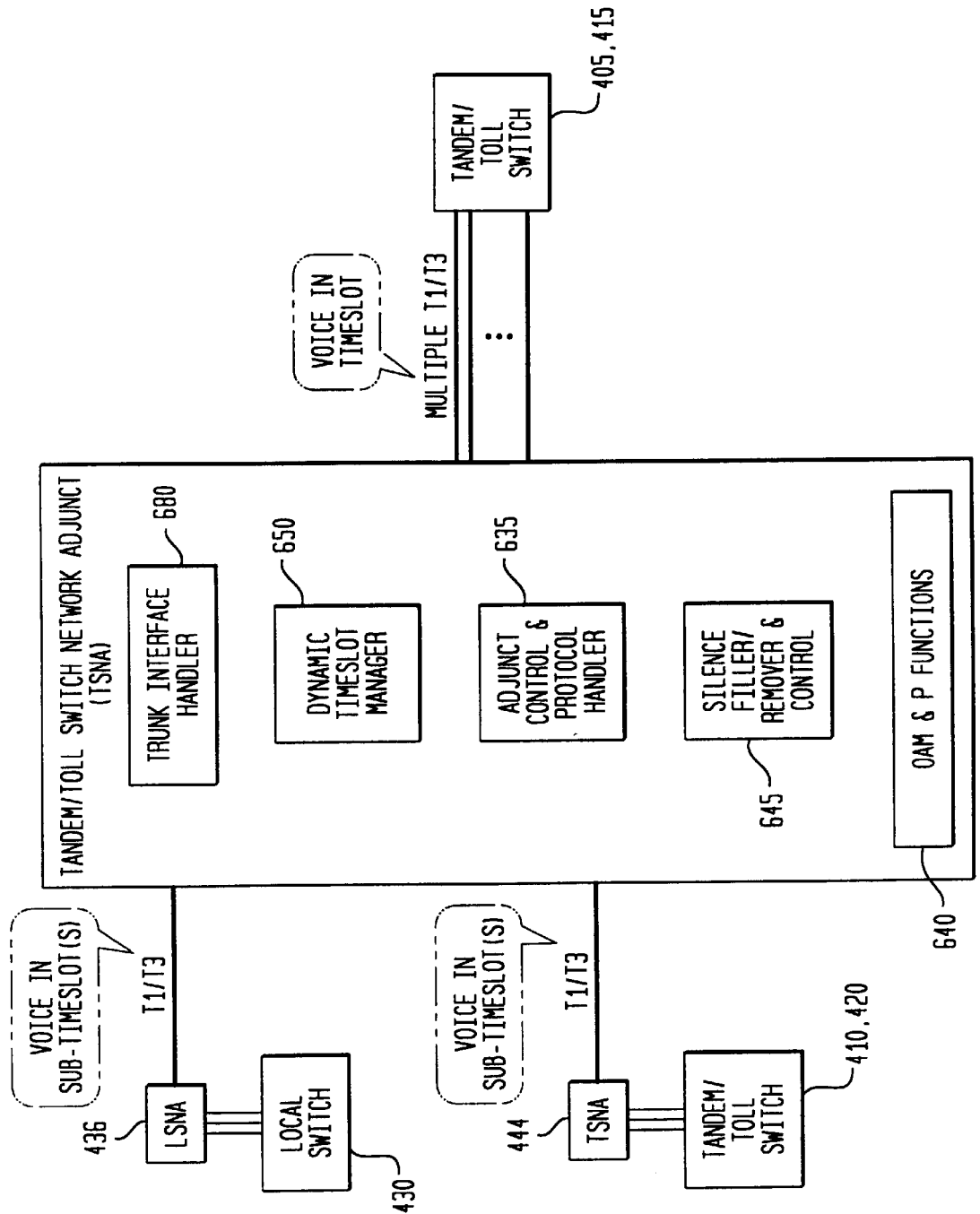
FIG. 6 provides an overview of the functionalities required of the toll/tandem switch network adjunct of the present invention.

FIG. 5 and FIG. 6 illustrate the various functionalities required of elements of a LSNA and a TSNA. Basically, these network adjuncts provide a subset of the following functionalities:

General Tone Detection (Only needed by LSNA)

The General Tone Detector is used to detect fax/modem tones and determine whether a particular communication is a fax or data communication as differentiated from a voice communication. If the appropriate tone is detected for fax or for data, the data that follows on the channel will be treated as fax/modem and a Speech Coder Selector may bypass the speech encoding function and keep the data as 64 Kbps PCM. A Timeslot Manager will then assign eight 8 Kbps (64 Kbps) sub-timeslots to this channel.

Energy Detection (Only needed by LSNA)

The voice activity detector is used to detect voice channel activity. The Speech Coder Selector can assign the lowest rate speech coder to this channel 1) if there is no activity (the trunk is idle) or 2) if the channel (trunk) is busy and used for carrying voice and silence is on the channel. The Speech Coder Selector may select a higher rate speech coder when the trunk group activity is low. In this way, the channel without activity will always take minimal bandwidth. As soon as channel activity is detected, the Speech Coder Selector may switch this channel to a higher rate speech coder based on local switch trunk group activity or switch to the 64 Kbps PCM if fax/modem tones are present.

Speech Coder Selection (Only needed by LSNA)

Depending on the result of tone and speech activity detection and the local switch trunk usage, the speech coder selector assigns a different speech coder to each voice channel communication or selects no coding for fax/modem communications. If a trunk group is especially busy, the coder selector may select a lesser level of coding than a conventional level of 64 Kbps in order to increase traffic carrying capacity. The selected coder information will also be passed to the Adjunct Control and Protocol Handler for building the inband control information message (for example, the control signal C of FIG. 3(a)).

Speech Encoding/Decoding (Only needed by LSNA)

This function provides a set or pool of low-bit rate toll quality speech coders that the Speech Coder Selector can choose from for a specific voice channel. Preferably there are provided a plurality of coding levels, for example, from minimum 8 kbps coding to 32 kbps coding. The function also provides a speech coder bypass function for 64 Kbps fax/modem data.

Dynamic Timeslot Manager

This function is responsible for putting the compressed/uncompressed voice/fax/modem data and inband control data into the sub-timeslot(s) format before transmitting to network. One format for a T1 frame is shown in FIG. 3 but the depicted frame is merely exemplary and may vary in content and composition. The inband control information is formatted by the Adjunct Control & Protocol Handler and passed to the Dynamic Timeslot Manager. It is also responsible for taking the data from sub-timeslot(s) and putting the data into timeslots before sending the timeslots to the tandem, toll or local switch. Presently, in the United States, the most prevalent toll or tandem switch is the #4ESS switch manufactured by Lucent Technologies. This switch, as well as other core network elements, only knows the conventional T1 formatted frame or equivalent frame. As a result the adjuncts placed in the network according to the present invention must accept the sub-timeslots and reformat them to T1 or related format before sending the information to the switches. The Dynamic Timeslot Manager is also responsible for extracting the inband control information from the control link and delivering it to the Adjunct Control & Protocol Handler.

Silence Filler/Remover and Control (Only needed by TSNA)

The silence filler/remover and control is responsible for filling the silence data to the compressed voice data to make it 64 Kbps before sending to the Tandem/Toll switch, or removing the filled silence data before transmitting to the network. For silence filler, if, for example, 8 bits are compressed into 2 bits, then the silence filler knows to fill the remaining six bits with silence and vice versa. It is also responsible for formatting the coding information for each traffic channel.

Adjunct Control & Protocol Handler

The adjunct control and protocol handler provides the proprietary protocol stack between any two adjuncts and the control functions for each adjunct. It formats the inband control message which contains channel to sub-timeslots mapping and the coding information of the channel. It instructs the Dynamic Timeslot Manager how to place the incoming variable rate data into a specific sub-timeslot or a bundled sub-timeslots. Based on the inband control message, it also instructs the Dynamic Timeslot Manager how to extract the variable rate data from a specific sub-timeslot or a bundled sub-timeslots.

OAM&P Functions

Provides the operation, administration, maintenance and provision functions for a network adjunct, either local or toll. It interfaces with all elements of the adjunct. It also acts as an interface to a network operation center.

Trunk Interface Handler

Provides functions to handle the network trunk interface.

Referring to FIG. 5, there are shown the required functionalities of the local switch network adjunct 500 and FIG. 6 describes the toll/tandem switch network adjunct. Referring first to FIG. 5 and as is well known in the art, the local switch 425 is the point of contact via wired (subscriber loop) or wireless means 596, 597, 598 to the telecommunications subscriber. The telecommunications subscriber may be equipped with a personal computer 421, a telephone for voice communication 422 or a facsimile machine 423. As introduced above, other subscriber apparatus may also be considered such as pager, video conferencing, cable television or intelligent or dumb terminal equipment and voice/fax/data signal origination is considered by way of example only. The subscriber initiates a call and during the call, the caller initiates voice/fax/data communication which is switched at the local switch 425 to a trunk 591, 592, 593 to another office of a trunk group of multiple T1/T3 trunks. The voice activity detector 510 and general tone detector 520 assess the idle or busy state of the trunks and, if busy, assess the voice/data/fax communications passing through the local switch to another local switch or to the toll network switch 410, 420. The speech coder selector 530 is coupled to the voice activity detector 510 and tone detector 520 for outputting control to the other elements including the coder pool 560, the adjunct control and protocol handler 570 and the dynamic timeslot manager 550. The trunk interface handler 580 assists in interfacing with interoffice digital trunk facilities.

Referring to FIG. 6, there is shown the functionality of a TSNA 600 of the present invention. The local switch 430 with an associated LSNA 436 communicates with TSNA 600 associated with a tandem switch. A tandem/toll switch 410, 420 communicates with a TSNA 600 associated with another tandem/toll switch 405, 415. The unique functionality of a TSNA 600 is the silence filler/remover and control 645 for filling or removing silence in sub-timeslot bundle to timeslot/channel conversion. The trunk interface handler 680 interfaces with the telephone switching office trunk groups, the dynamic timeslot manager handles sub-timeslot allocation/deallocation in real time and the adjunct control and protocol handler generates control data and other functions as already described above.

Figure 7:
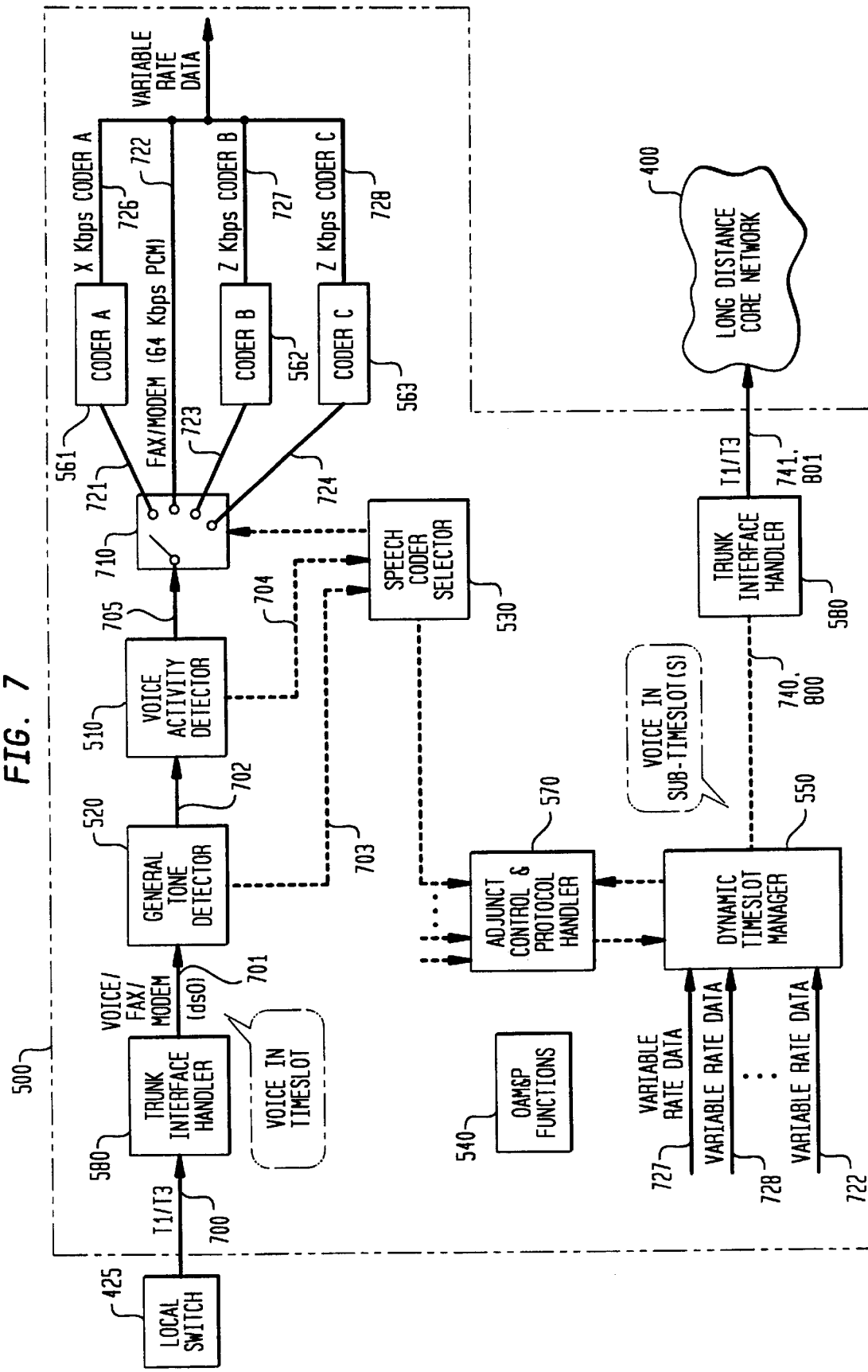
FIG. 7 provides a detailed functional block diagram of the data flow via a local switch network adjunct from a local switch 425 to a toll network 400.

The flow of data through a LSNA 500 from the local switch 425 to the network 400 (receive path) is illustrated in FIG. 7. The voice, fax, or modem data from the local switch 425 typically takes one DS0 (64 Kbps) for each channel. Before it is transmitted to the long distance core network 400, however, and according to the present invention, the LSN Adjunct 500 will compress the voice in a certain speech code format, for example, according to FIG. 3 and dynamically put the compressed voice data into a sub-timeslot or a bundle or group of sub-timeslots, depending on the type of coding scheme used for compressing the information. The detailed sequence is explained as follows. Each DS0 traffic first passes through the General Tone Detector 520 and the Voice Activity Detector 510 combination to determine the voice activity and whether the traffic is fax/modem. While the order of pass through is shown to be detector 520 to detector 510, the order may be reversed or 510 to 520 or the pass through may be in parallel (not shown). If the traffic is of the type fax or modem, the traffic will not be compressed and will be transmitted at 64 Kbps, which takes a bundled 8 sub-timeslots per path 722. The voice and any unused (idle) or silent channel will be encoded in a certain speech code format depending on the local switch trunk usage and voice/fax/data activity. An encoded voice channel may take a single sub-timeslot or a bundle of sub-timeslots. Consequently, an idle channel or trunk and a silent, busy voice channel require a minimum level of coding while speech activity and fax/data activity require a higher level of coding. Depending on the coding employed, the speech coder selector 530 accepts input from the tone detector and voice activity detector 510 and selects a coder. The coder selector then determines which coder from a pool of coders 561, 562, 563 which may be a varying levels of coding as described above or select no coding, path 722. Thus, there are several factors associated with coder selection which include trunk utilization, fax/modem tone detection and speech/silence detection. The most important of these may be tone detection for differentiation between no coding, for example, path 722, and some coding, for example, path 721, 723 or 724.

Tone detectors are well known and comprise, example, general tone detectors, so-called band detectors, call progress tone, special information tone, data, fax and address signal tone detectors among other tone detectors used in national and international networks. Voice activity detectors are well known and are frequently employed in networks, for example, in echo reduction apparatus and other applications.

The Dynamic Timeslot Manager 550 is responsible for putting the compressed or uncompressed voice, fax or modem data on to the T1/T3/OC3 trunk 741 via the trunk interface handler 580, with the inband control information for describing how the information was compressed provided by the Adjunct Control & Protocol Handler 570, before transmitting it to the long distance core network 400. In this manner, the receiving equipment can utilize the inband control information during a decompression phase to extract the original information. As earlier indicated, control information may be transmitted over several frames, collected and then interpreted. Once received, the control information is extracted and concatenated to obtain complete control information. The amount of control information may vary by implementation and the amount of delay that can be tolerated in the network as described above.

There are two trunk interface handlers 580 shown in FIG. 7. In the upper left portion of the drawing, a local switch provides T1/T3 trunks to trunk interface handler 580 for outputting voice/fax/modem traffic (DS0) where the voice is in timeslots to detectors 510, 520. In the bottom portion of FIG. 7, the dynamic timeslot manager outputs the voice in sub-timeslots 740 to trunk interface handler 580 for outputting T1/T3 to the network 400. Circuit apparatus is known for providing T1 trunk interface control, for example, circuit apparatus available from Dialogic Corporation, with offices in Parsippany, N.J.

Figure 8:
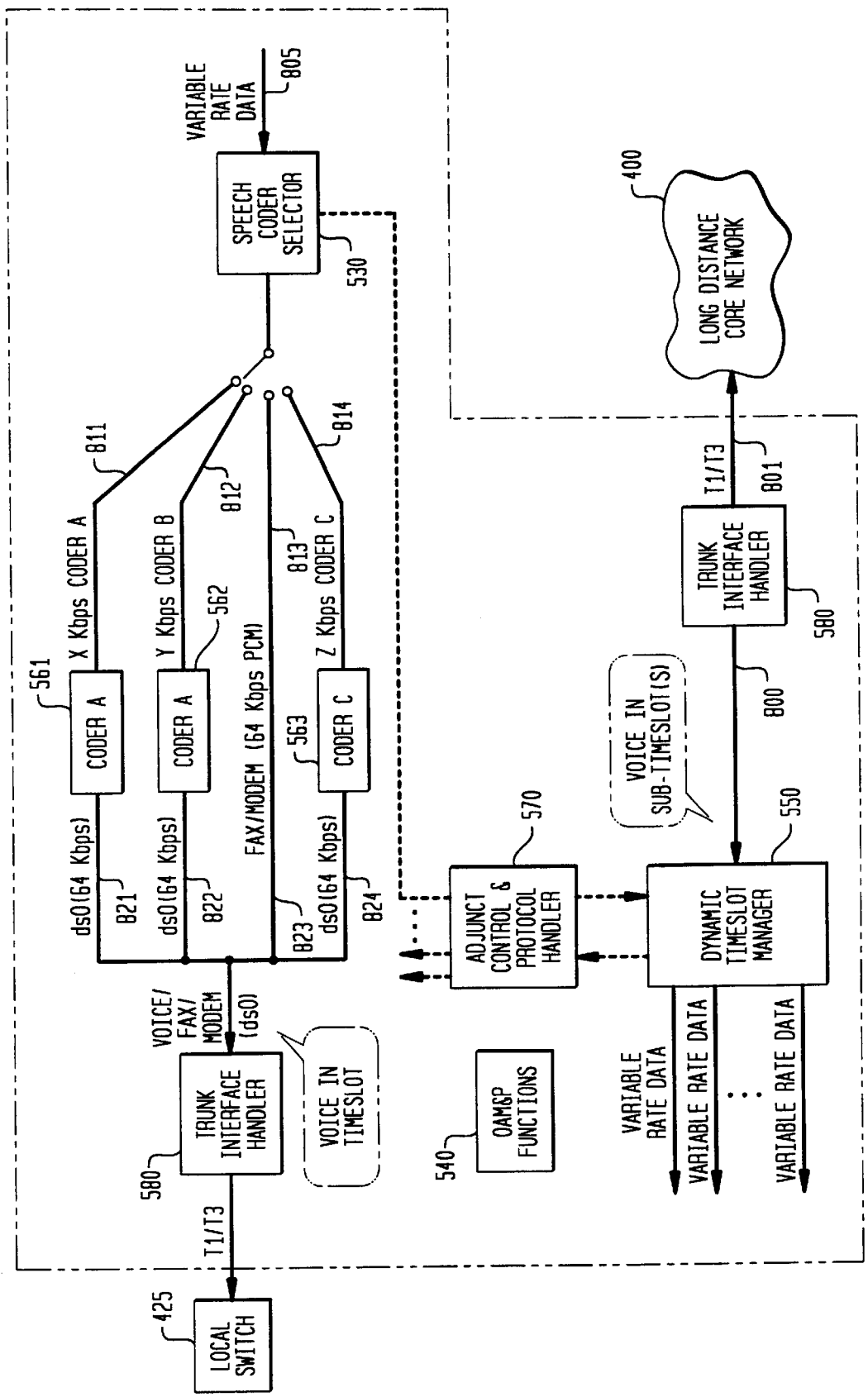
FIG. 8 provides a detailed functional block diagram of the data flow via a local switch network adjunct from the network 400 to a local switch 425.

The flow of data through a LSNA 500 from the network 400 to the local switch 425 (transmit path) is shown in FIG. 8. T1/T3 trunk groups 801 receive traffic from the long distance network 400. The voice traffic from the long distance core network 400 and output from trunk interface handler 580 is in compressed sub-timeslot format 800. The Adjunct Control & Protocol Handler 570 will process the inband control information and instruct the Dynamic Timeslot Manager 550 to channelize the incoming traffic by mapping the incoming sub-timeslot(s) into an original timeslot. The original timeslot is output to trunk interface handler 580 coupled to local switch 425. Handler 570 will also instruct the Speech Coder Selector 530 to provide a correct speech decoder function 561, 562, 563 or no function 813 to each channel. Each compressed voice channel will be decoded into the 64 Kbps PCM format and placed onto a DS0 and sent to the local switch 425 via trunk interface handler 580.

Figure 9:
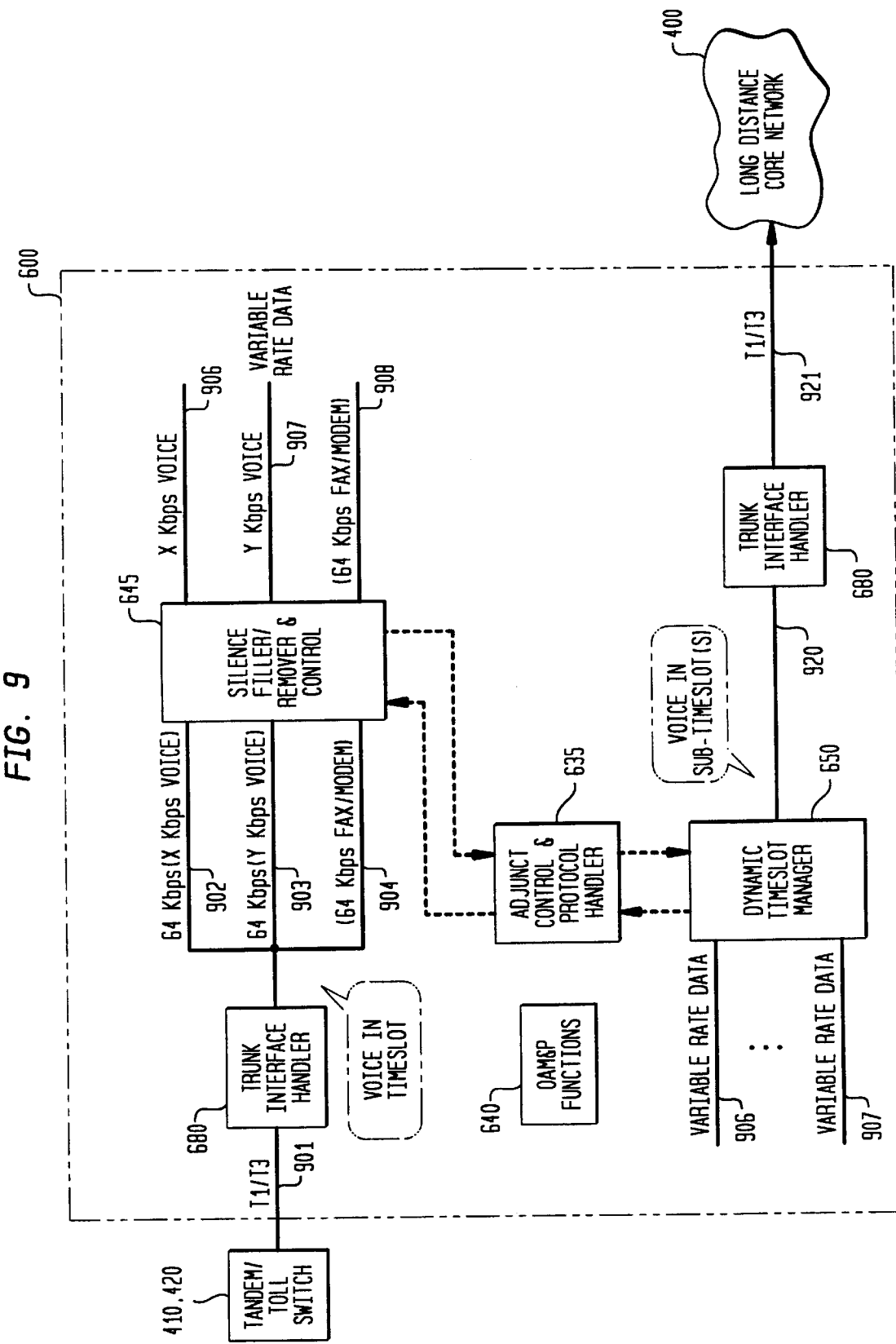
FIG. 9 provides a detailed functional block diagram of the data flow via a toll-tandem switch network adjunct to and from the toll network 400 in association with its toll/tandem switch 410 or 420.

The data flow through a TSNA 600 is shown in FIG. 9. In the transmit path (network 400 to switch 410, 420), the voice traffic from the long distance core network 400 is output in compressed sub-timeslot format from trunk interface handler 680 to dynamic timeslot manager 650. The Adjunct Control & Protocol Handler 635 will process the inband control information and instruct the Dynamic Timeslot Manager 650 to channelize the incoming traffic by mapping the incoming sub-timeslot(s) into an original timeslot. Based on the inband control information, the Silence Filler/Remover & Controller 645 will fill the silence bits to each DS0 timeslot to make it a conventional 64 Kbps rate signal and then send the data in its original timeslot via trunk interface handler 680 coupled to the tandem/toll switch 410, 420. For the silence filler function, if 8 bits of information are compressed into 2 bits, then the remaining 6 bits in a word must be filled with silence. Hence, a word will have 2 bits of actual data and 6 bits of silence. This must be reflected in the control information C of FIG. 3. For example, a control frame of duration 125 microseconds can be inserted before the reformatted frame of the present invention that specifies that the following frame carries so many bits of silence and so many bits of data. The delay introduced by an additional control frame of data may have negligible impact on voice quality. Silence removal, on the other hand, may be wholly dependent on reading the control information and extracting silence bits added at locations indicated by the control information. The coding information for each channel extracted from the inband control information will pass through the toll or tandem switch 410, 420 as control data. In the receive path (switch to network), the voice, fax, or modem data from the tandem/toll switch 410, 420 occupies one 64 Kbps DS0 for each T1/T3 channel. The voice traffic is in compressed format with silence filler and the fax/modem traffic is uncompressed. The Silence Filler/Remover & Controller 645 will detect the coding information carried through the switch 410, 420, and remove the filled silence bit(s) for voice from the voice timeslots accordingly. The Dynamic Timeslot Manager 650 is responsible for putting the compressed or uncompressed voice, fax or modem data on to the T1/T3/OC3 trunk with the inband control information provided by the Adjunct Control & Protocol Handler 635 before transmitting to the long distance core network 400.

The actual adjunct protocol, inband control information format, and coding information format are not described in great detail but, in any event, follow the principle that idle and silent channels require less coding than active voice, fax or data channels. There may be only one other level of coding, for example, a minimum level of coding besides an existing 64 Kbps level of coding or multiple levels of coding, such as 8 Kbps, 16 kbps, 24, Kbps and 64 Kbps. Consequently, while fewer than eight bits have been utilized for transmitting a channel in a T1 or E1 frame, the present invention suggests as few as one bit or sub-timeslot may adequately describe status/activity or a trunk/channel at a given point in time.

Thus, there has been shown and described a method and apparatus for enhancing transmission capacity in the existing digital data transmission facility hierarchy where the T1 or E1 frame data format may be considered as comprising a plurality of sub-timeslots which may be arranged in bundles or groups depending, for example, on speech activity, fax or data communication. The concept of the present invention may be extended to larger trunk groups than on a T1 or E1 frame size basis. When a channel is idle or silent, minimum data need be transmitted freeing and enhancing transmission capacity of the digital transmission facilities between offices in the public switched network. Any United States patent applications or patents referred to herein should be deemed to be incorporated by reference as to their entire contents. The scope of the invention should only be deemed to be limited by the scope of the claims which follow.

What we claim is:

1. A telephone circuit switched network with dynamically allocable bandwidth, comprising:
    a plurality of local switch network adjuncts;
    a plurality of tandem switch network adjuncts, one of said tandem switch network adjuncts being connected to one of said local switch network adjuncts and being further connected to a tandem switch;
    a plurality of toll switch network adjuncts, one of said toll switch network adjuncts being connected to one of said tandem switch network adjuncts and being further connected to a toll switch;
    wherein said local switch network adjuncts, said tandem switch network adjuncts, and said toll switch network adjuncts communicate information using reformatted frame sub-timeslots,
    wherein a network adjunct connected to a local switch, comprises:
        a trunk interface handler interconnected to said network;
        a detector connected to the said trunk interface handler, said detector for discriminating fax and modem data from voice data and activity associated with a channel;
        a speech coder selector coupled to said detector for selecting a coder for a specific communication;
        at least one speech coder connected to said speech coder selector, said coder for encoding voice data;
        a speech decoder connected to said speech coder selector, said speech decoder for decoding voice data;
        a dynamic timeslot manager connected to said speech encoder and said speech decoder, said timeslot manager for assembling said encoded data into sub-timeslots and extracting data from sub-timeslots;
        an adjunct control and protocol handler connected to said dynamic timeslot manager, said handler for formatting an inband control message; and
        a management interface for managing elements of said network adjunct.

2. A network adjunct as recited in claim 1 wherein said activity comprises one of voice activity and trunk group activity.

3. A telephone circuit switched network with dynamically allocable bandwidth, comprising:
    a plurality of local switch network adjuncts;
    a plurality of tandem switch network adjuncts, one of said tandem switch network adjuncts being connected to one of said local switch network adjuncts and being further connected to a tandem switch;
    a plurality of toll switch network adjuncts, one of said toll switch network adjuncts being connected to one of said tandem switch network adjuncts and being further connected to a toll switch;
    wherein said local switch network adjuncts, said tandem switch network adjuncts, and said toll switch network adjuncts communicate information using reformatted frame sub-timeslots,
    wherein a network adjunct connected to one of a tandem or a toll switch comprises:
        a trunk interface handler connected to said network;
        a dynamic timeslot manager for allocating encoded data to sub-timeslots and extracting data from sub-timeslots;
        a silence filler and remover controller connected to said dynamic timeslot manager, said silence filler and remover controller for adding silence data to compressed voice data and removing silence data from compressed voice data;
        an adjunct control and protocol handler connected to said dynamic timeslot manager for formatting the inband control message; and
        a management interface for managing elements of said network adjunct.

4. A telephone circuit switched network with dynamically allocable bandwidth, comprising:
    a plurality of local switch network adjuncts;
    a plurality of tandem switch network adjuncts, one of said tandem switch network adjuncts being connected to one of said local switch network adjuncts and being further connected to a tandem switch;
    a plurality of toll switch network adjuncts, one of said toll switch network adjuncts being connected to one of said tandem switch network adjuncts and being further connected to a toll switch;
    wherein said local switch network adjuncts, said tandem switch network adjuncts, and said toll switch network adjuncts communicate information using reformatted frame sub-timeslots,
    wherein each local switch network adjunct comprises:
        a trunk interface handler interconnected to said network;
        a detector interconnected to said trunk interface handler, said detector for discriminating fax and modem data from voice data and for detecting activity associated with a channel;
        a speech coder selector connected to said detector, said selector for assigning a coder to a specific communication;
        a speech encoder connected to said speech coder selector, said speech encoder for encoding the voice data;
        a dynamic timeslot manager connected to said speech encoder and said speech decoder, said manager for allocating said encoded data to sub-timeslots and extracting data from sub-timeslots;

an adjunct control and protocol handler connected to said dynamic timeslot manager, said handler for formatting an inband control message; and a management interface for managing elements of said network adjunct.

5. A network as recited in claim 4 wherein said activity comprises one of trunk group activity and voice activity.

6. The network of claim 4, wherein said local switch network adjunct further comprises:

a first connection to a local switch to which it is connected; and a second connection to a tandem switch.

7. The network of claim 4, wherein each network adjunct of one of a toll or tandem switch comprises:

a trunk interface handler connected to said network;

a dynamic timeslot manager for allocating said encoded data to sub-timeslots and extracting data from sub-timeslots;

a silence filler and remover controller connected to said dynamic timeslot manager for adding silence data to compressed voice data and removing silence data from compressed voice data;

an adjunct control and protocol handler connected to said dynamic timeslot manager for formatting the inband control message; and a management interface for managing elements of said network adjunct.

8. The network of claim 4, wherein each network adjunct connected to a tandem switch comprises:

a first connection to a network adjunct connected to a local switch that said tandem switch serves;

a second connection to each network adjunct connected to a tandem switch that serves said tandem switch; and a third connection to each network adjunct connected to a toll switch that serves said tandem switch.

9. The network of claim 4, wherein a network adjunct connected to a toll switch comprises:

a first connection to another network adjunct connected to a tandem switch that serves said toll switch; and a second connection to another network adjunct connected to a toll switch that serves said toll switch.

10. The network of claim 4, wherein each network adjunct connected to a tandem switch handles all inband traffic received by said tandem switch.

11. The network of claim 4, wherein each network adjunct connected to a toll switch handles all inband traffic received by said toll switch.

12. The network of claim 4, wherein each network adjunct connected to a local switch handles all inband traffic received by said tandem switch.

* * * * *